United States Patent [19]

Rosenbloom, Jr. et al.

[11] 4,312,691

[45] Jan. 26, 1982

[54] SYSTEM FOR PREPARING IDENTIFICATION CARDS

[75] Inventors: Percy Rosenbloom, Jr.; Nancy P. Youngblood, both of Jacksonville, Fla.

[73] Assignee: Technical Materials, Inc., Jacksonville, Fla.

[21] Appl. No.: 150,300

[22] Filed: May 16, 1980

[51] Int. Cl.[3] ........................ B32B 31/06; B32B 31/18

[52] U.S. Cl. .................................... 156/267; 40/2 R; 40/2.2; 156/293; 156/514

[58] Field of Search ................. 156/267, 277, 293, 58, 156/213, 219, 227, 514; 40/2.2, 152, 158 B, 2 R; 283/7; 428/13

[56] References Cited

U.S. PATENT DOCUMENTS

| | | | |
|---|---|---|---|
| 3,068,140 | 12/1962 | Biddle | 156/277 |
| 3,855,033 | 12/1974 | Staats | 156/293 |
| 4,151,667 | 5/1979 | Idelson et al. | 40/2.2 |

*Primary Examiner*—Caleb Weston

*Attorney, Agent, or Firm*—Arthur G. Yeager

[57] ABSTRACT

System for rapid preparation of an identification card comprising (a) photographing the subject with an automatic rapid development camera in which the view finder is focused offcenter to produce a photograph wherein the subject's head appears at a predetermined offcenter location;

(b) placing the developed photograph between the two halves of a single folded card having a back half and a front half with a precut aperture which opens over the head of the subject in the photograph;

(c) trimming the excess of the photograph that extends beyond the edges of the card; and (d) sealing the two halves and the photograph to each other to produce a three-layer laminate.

13 Claims, 6 Drawing Figures

SYSTEM FOR PREPARING IDENTIFICATION CARDS

BACKGROUND OF THE INVENTION

This invention relates to a rapid system of producing an identification card containing a photograph of the subject. At large manufacturing plants or large office headquarters where there is a necessity for maintaining security to prevent unauthorized viewing of secret matters it has been customary to require all personnel to wear identification cards. Normally such identification cards contain a photograph of the subject, the name of the subject, and the signature of the subject. As might be expected the preparation of a durable identification card having these features, takes a substantial amount of time, and while this might be acceptable with respect to an employee, it would be intolerable to a visitor.

It is an object of this invention to provide a system whereby an identification card containing a photograph of the subject can be prepared in a few minutes. It is another object of this invention to provide such a system which can be carried by one person from place to place and operated by only one person. Still other objects will become apparent from the more detailed portion of this description.

BRIEF SUMMARY OF THE INVENTION

This invention provides a system for rapid preparation of an identification card containing a photograph of the subject comprising:

(a) photographing the subject with an automatic rapid development camera having a viewfinder which includes focusing means to assure that the subject being photographed will appear in a predetermined offcenter location in the photograph;

(b) placing the developed photograph between the folded halves of a precut card having a single fold dividing the card into a front half and a back half, said front half having a precut aperture located such that the head of the subject in the photograph will be generally centered in the aperture when one edge of the photograph is positioned at said fold and said front half and said back half are closed on each other;

(c) trimming the excess of said photograph which extends beyond the edges of said folded card; and (d) sealing and front half to said back half to produce a laminate.

Another embodiment of this invention provides a system for rapid preparation of an identification card containing a photograph of the subject comprising (a) photographing the subject with an automatic, rapid development camera having a view finder which includes focusing means to locate the subject being photographed in a predetermined offcenter location in the rectangular developed photograph;

(b) placing the developed photograph behind a rectangular precut card smaller than the developed photograph, said card having a precut window located such that the head of the subject in the photograph will be substantially centered in the window when two edges of each said card and photograph are aligned;

(c) trimming the excess portion of the developed photograph which extends beyond the extent of the card; and (d) sealing the card and photograph to produce a laminate.

In specific embodiments of this invention the final laminate is enclosed in a plastic cover; the focusing means comprises offcenter cross hairs; and the cut out aperture is in one of the two lower corners of the front half of the card.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
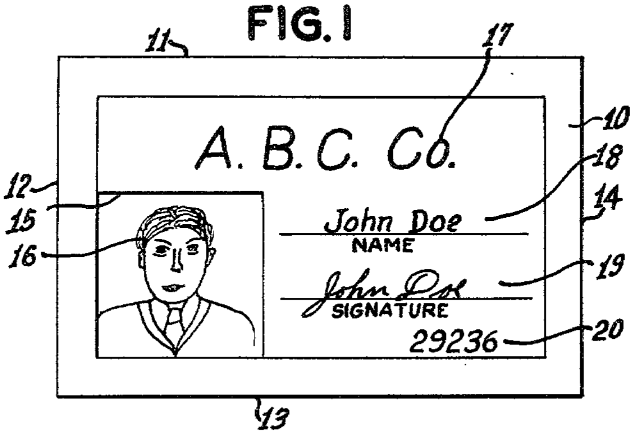
FIG. 1 is a top plan view of the finished identification card of this invention.

In FIG. 1 there is illustrated the finished form of the identification card of this invention. This front half of the card 10 shown in this drawing with a fold 11 along the top and three cut edges, 12, 13, and 14 completing the rectangular shape of the card. Any other shape of card can be employed, with or without fold 11, although rectangular is most convenient. It is also an operable alternative for fold 11 to be located at any edge (i.e. 12,13, or 14) rather than at the top edge as shown in this drawing.

The face of card 10 contains a cut-out aperture 15 which permits a view of a photograph of the head 16 of the person being identified. Other portions of the face of card 10 may be devoted to whatever purposes desired by the issuer of the card. Normally, the card might include the name of the issuing authority 17, a space 18 to print or type the name of the subject, a space 19 for the subject's signature, and a number for registration of the card.

Figure 3:
FIG. 3 is a side elevational side view of the card shown in FIG. 2.
Figure 2:
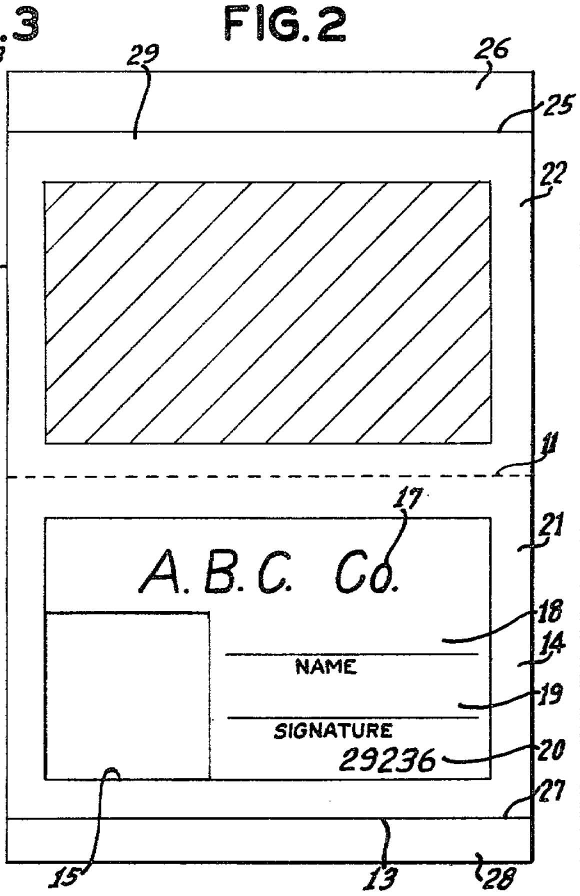
FIG. 2 is a top plan view of a precut, preprinted folding card for use in this invention.
Figure 4:
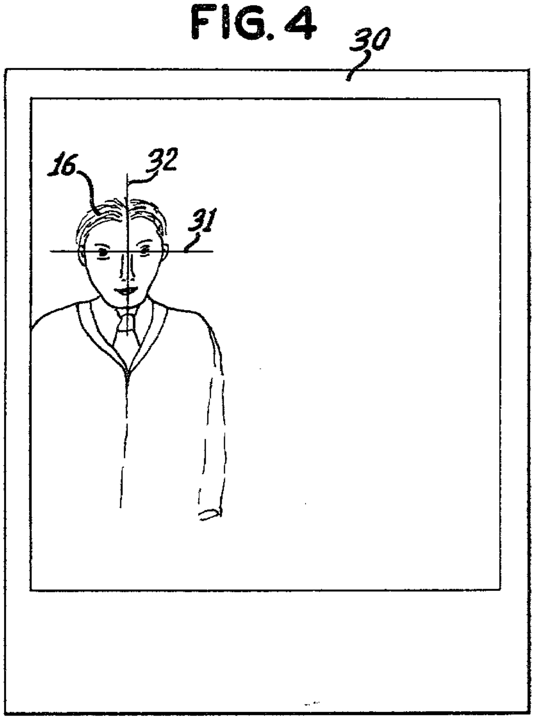
FIG. 4 is a top plan view of a photograph for use in connection with the card of FIG. 2 is this invention.

In FIGS. 2, 3, and 4, there may be seen the component parts of the identification card 10. In FIGS. 2 and 3 there is shown a blank card 29 having a front half 21, a back half 22, and a fold line 11. Front half 21 contains the cut-out aperture 15 and the printing and spaces (17–20) as described above with respect to FIG. 1. Since card 29 is eventually made into a laminate as shown in FIG. 1, it is desirable that the back side of the card be coated with a pressure-sensitive cement. Accordingly, card 29 is coated with cement 23, and the cement is covered with a backing sheet 24 which is capable of being peeled off manually to expose cement 23 for use in laminating front half 21 to back half 22. In order to facilitate removal of backing sheet 24 card 29 may be precut at 25 to provide strip 26 for manual gripping and/or precut at 27 to provide strip 28 for manual gripping.

In FIG. 4, there is shown a developed photograph 30 of a subject. This photograph illustrates how it might appear for use in one embodiment of this invention. The subject is shown off-center in photograph 30 and this is done purposely to make the head 16 of the subject be positioned at aperture 15 when 29 is assembled with photograph 30. In order to be reasonably precise in the positioning of head 16, the view finder of the camera taking photograph 30 should be modified to some extent. For example, cross hairs may be superimposed offset from the center on the viewfinder and these crosshairs used to focus the camera by aligning the horizontal hair 31 across the eyes of the subject and the vertical hair 32 in the middle of the nose of the subject. It is apparent that other means could be used to accomplish this same purpose, such as focusing the camera through an unmodified view finder onto a predetermined target which is spaced sufficiently away from the subject to produce the same off-center photograph. Any means which will accomplish the purpose of producing the off-center photograph is acceptable.

It is also to be noted that the direction of offset in the photograph must correlate with the positioning of aperture 15 in card 29. In the present illustration aperture 15 is shown in the lower left corner of front half 21 of card 29. It makes no difference where aperture 15 is located on card 29 if photograph 30 is made to correspond therewith by having head 16 located in the center of aperture 15 when the assembly is made to produce identification card 10 (FIG. 1).

Figure 5:
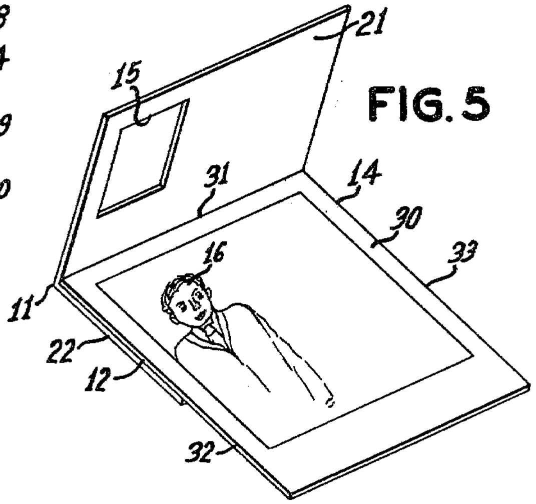
FIG. 5 is a perspective view of the assembly of the card of FIG. 2 and the photograph of FIG. 4.
Figure 6:
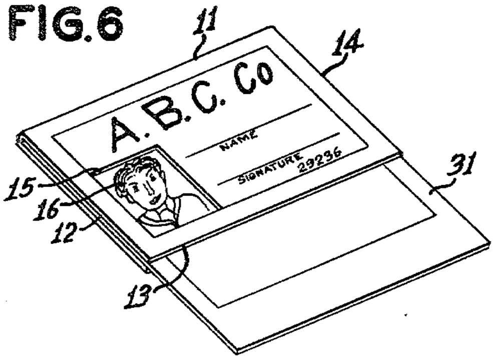
FIG. 6 is a perspective view of the assembly of FIG. 5 with the front half of the card folded down over the photograph.

The assembly of card 29 and photograph 30 to produce card 10 is shown in FIGS. 5 and 6. Card 29 is prepared by peeling away backing sheet 24 along with strips 26 and 28 and placing back half 22 face downward on a flat surface, leaving cement layer 23 facing upward. Photograph 30 is then placed, facing upward, on the cement layer 23 on back half 22. Front half 21 is then folded down along fold line 11 and pressed against the front of photograph 30 to produce a three-layer laminate as shown in FIG. 6. The portion 31 of photograph 30 extending beyond edges 12,13, and 14 of front half 21 is trimmed away, e.g. by scissors. The remaining portion is identical to card 10 of FIG. 1 and may be used as such, or, if desired, encased in plastic to provide durability and a means for breast pocket holder, or the like.

In FIGS. 5 and 6 there is shown a preferred embodiment of the invention which permits ease of assembly with little opportunity for mistakes. The positioning of aperture 15, head 16, and the respective dimensions of card 29 and photograph 30 are so prearranged that top edge 31 of photograph 30 is placed along fold line 11 with the two side edges 32 and 33 of photograph 30 aligned with cut edges 12 and 14 of card 29. Thereby front half 21 can be closed onto photograph 30 evenly around three of the four edges of photograph 30 to produce a firm laminate. It is, of course, entirely possible to employ other means for aligning the edges of the photograph so as to cause aperture 15 to be centered over head 16 of the photograph. Any of such means falls within the scope of this invention since it is only necessary to produce such a laminate using a rapid development camera and precut cards as described above.

It is also preferred that card 29 be made with a precut location for aperture 15 which can at the last moment be punched out manually to produce aperture 15. This permits ease of manufacture when cement layer 23 is applied, and safeguards against any premature or undesired adhesion around aperture 15.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A system for rapid preparation of an identification card containing a photograph of the subject comprising
   (a.) photographing the subject with an automatic, rapid development camera having a viewfinder which includes focusing means to assure that the subject being photographed will appear in a predetermined off-center location in the developed photograph;
   (b.) placing the developed photograph between the folded halves of a precut card having a single fold dividing the card into a front half and a back half, said front half having a precut aperture located such that the head of the subject in the photograph will be generally centered in the aperture when one edge of the photograph is positioned at said fold and said front half and said back half are closed on each other;
   (c.) trimming the excess of said photograph which extends beyond the edges of said folded card; and
   (d.) sealing said front half to said back half to produce a laminate.

2. The system of claim 1 wherein said focusing means comprises cross hairs in the optical field of said viewfinder.

3. The system of claim 1 which additionally comprises the application of a transparent plastic cover over said laminate.

4. The system of claim 1 wherein said aperture is a generally square cut-out portion located in one of the two lower corners of said front half of the card.

5. The system of claim 1 wherein said precut card contains preprinted portions on said front half for the name of the organization issuing said identification card, the name of the bearer of the card, and the bearer's signature.

6. The system of claim 1 wherein the location of said aperture is so correlated with said focusing means that when the top edge of said photograph is placed along said fold and an adjacent edge of said photograph is aligned with a corresponding adjacent edge of said card, the head of the photographed subject will be centered in said aperture.

7. The system of claim 1 in which said laminate is about $2\frac{1}{4}$ inches by $3\frac{1}{2}$ inches in size and said aperture is about $1\frac{1}{8}$ inches by $1\frac{1}{4}$ inches in size and is located in the lower left corner of said front half.

8. The system of claim 1 wherein said card has a precut punch-out portion which when manually removed results in said aperture.

9. A system for rapid preparation of an identification card containing a photograph of the subject comprising (a.) photographing the subject with an automatic, rapid development camera having a view finder which includes focusing means to locate the subject being photographed in a predetermined off-center location in the rectangular developed photograph;

(b.) placing the developed photograph behind a rectangular precut card smaller than the developed photograph, said card having a precut window located such that the head of the subject in the photograph will be substantially centered in the window when two edges of each said card and photograph are aligned;

(c.) trimming the excess portion of the developed photograph which extends beyond the extent of the card; and (d.) sealing the card and photograph to produce a laminate.

10. The system of claim 9 wherein the focusing means comprises cross hairs in the optical field of the view finder.

11. The system of claim 10 wherein the cross hairs are off center from the center of the optical field of the view finder.

12. The system of claim 9 which comprises applying a transparent plastic cover over the laminate.

13. The system of claim 9 wherein the window is a generally square cut-out portion located in one of the two lower corners of the card.

* * * * *